United States Patent [19]

Robinson et al.

[11] 3,808,065

[45] Apr. 30, 1974

[54] METHOD OF POLISHING SAPPHIRE AND SPINEL

[75] Inventors: Paul Harvey Robinson; Richard Oren Wance, both of Trenton, N.J.

[73] Assignee: RCA Corporation, New York, N.Y.

[22] Filed: Feb. 28, 1972

[21] Appl. No.: 229,749

[52] U.S. Cl. .......... 156/2, 156/6, 156/20, 156/345, 252/79.1

[51] Int. Cl. .......... C23f 1/00

[58] Field of Search .......... 156/2, 6, 17, 20, 345; 252/79.1

[56] References Cited

UNITED STATES PATENTS

| | | | |
|---|---|---|---|
| 1,806,588 | 5/1931 | Espig et al. | 156/2 |
| 2,510,219 | 6/1950 | Graham | 156/2 |

*Primary Examiner*—William A. Powell

*Attorney, Agent, or Firm*—Glenn H. Bruestle; William S. Hill

[57] ABSTRACT

The $(1\bar{1}02)$ crystallographic oriented surfaces of sapphire wafers and the (100) crystallographic oriented surfaces of spinel wafers are chemically polished by immersing the wafers in a melt of molten borax. For chemically polishing the sapphire wafers, the melt is heated to a temperature of between 1,000°C and 1,200°C and adjacent surfaces of adjacent wafers are spaced between about 7 and 13 mils from each other when immersed in the melt. The melt should include between 5 and 10 mole per cent of aluminum oxide if only a single wafer of sapphire is to be polished. For polishing the spinel wafers, the melt of anhydrous molten borax should be heated to a temperature of between 800°C and 900°C and the wafers should be separated from each other by at least 125 mils.

6 Claims, 4 Drawing Figures

METHOD OF POLISHING SAPPHIRE AND SPINEL

BACKGROUND OF THE INVENTION

This invention relates generally to a method of polishing the surface of sapphire and spinel bodies, and, more particularly, to a method of chemically polishing these bodies.

Substrates of sapphire and spinel with smooth surfaces, free from work damage and scratches, are useful as substrates upon which to deposit epitaxial silicon films, used in the electronic integrated circuit art. Single-crystal sapphire and spinel boules are commercially available with diameters ranging from ¼ inch to about 3 inches. To prepare these substrates for growing epitaxial layers of silicon thereon, the boule is oriented by x-ray Laue' techniques to a specific sapphire plane. The most common plane for MOS applications is $(1\bar{1}02)$, or equivalent, which is about 57° to the "C" axis. The oriented boule is sliced into wafers with a diamond saw, and the wafers are polished, using high pressures and diamond grits of successively smaller grit sizes to provide a smooth, scratch-free, substrate surface. This prior art polishing method is relatively expensive and difficult to carry out because sapphire and spinel are relatively very hard materials. It has been proposed to chemically polish sapphire wafers by disposing the surface of the wafer in the vapors of molten borax heated to a temperature of between 1,000°C and 1,200°C. When, however, a body of sapphire or spinel was immersed in molten borax under the aforementioned conditions, preferential etching took place that resulted in the surfaces of the sapphire and spinel bodies being badly pitted.

SUMMARY OF THE INVENTION

The novel method of polishing the surfaces of sapphire and spinel bodies comprises immersing the bodies in a melt comprising molten borax. In one embodiment of the novel method, the $(1\bar{1}02)$, or equivalent, crystallographic oriented surfaces of a plurality of sapphire wafers are chemically polished by disposing the wafers in a line, or row, with the adjacent surfaces of adjacent wafers spaced from each other a distance of between about 7 and 13 mils, and immersing the wafers, so disposed, in a melt of molten borax heated to a temperature of between 1,000°C and 1,200°C to remove at least 1 mil of material from each surface.

In another embodiment of the novel method, the $(1\bar{1}02)$, or equivalent, crystallographic oriented surfaces of a sapphire body are chemically etched in a melt comprising molten borax and between 5 and 10 mole per cent aluminum oxide, heated to a temperature of between 1,000°C and 1,200°C.

In a further embodiment of the novel method, the (100) crystallographic oriented surface of a spinel body is chemically polished by immersing the body in a melt consisting of borax, heated to a temperature of between 800°C and 900°C.

In still a further embodiment of the novel method, the surfaces of a plurality of spinel wafers are chemically polished by separating adjacent surfaces of adjacent wafers from each other by at least 125 mils, and immersing the wafers in a melt consisting of molten borax heated to a temperature of between 800°C and 900°C.

In all of the aformentioned embodiments, it is desirable for the bodies, or wafers, to be rough lapped with an abrasive powder with particles having an average diameter of about 25 μm.

DESCRIPTION OF THE PREFERRED EMBODIMENTS

Figure 1:
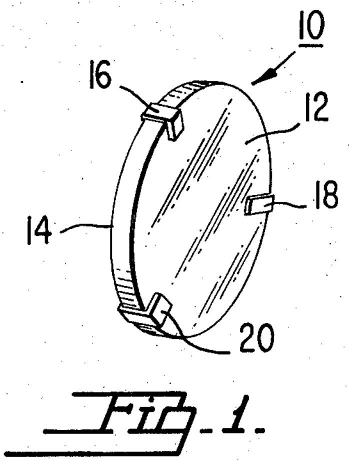
FIG. 1 is a perspective view of a wafer of either sapphire or spinel provided with spacer clips to separate the wafer from a similar adjacent wafer when placed in a stack, or row, of wafers.

Referring now to FIG. 1 of the drawing, there is shown an electrically insulating, single-crystal body, or wafer 10 in the shape of a somewhat circular disc, of either sapphire ($Al_2O_3$) or spinel $(Al_2O_3)_X(MgO)_y$, where X = *a* number from 1 to 5 and *y* = 1. If, for example, the wafer 10 is a wafer of sapphire, the opposite major surfaces 12 and 14 to be chemically polished would be the $(1\bar{1}02)$ crystallographic oriented surfaces, or equivalent, such as the $(\bar{1}012)$ or the $(01\bar{1}2)$ crystallographic oriented surfaces. If, on the other hand, the wafer 10 were a wafer of spinel, the major surfaces 12 and 14 to be chemically polished would be the (100) crystallographic oriented surfaces. The aforementioned crystallographic oriented surfaces of sapphire and spinel are those on which it is desired to receive a layer of (100) oriented epitaxial silicon from the vapor state, as from a vapor deposition process well-known in the electronic integrated circuit manufacturing art.

The wafer 10 is used in the electronic integrated circuit art as an electrically insulating single-crystal substrate. Its diameter may vary between ¼ inch and 3 inches, and its thickness for many applications, before polishing, is usually about 15 mils. Three spacers 16, 18, and 20, such as spacer clips of platinum, whose thickness may vary between 7 and 13 mils, are disposed, equally spaced from each other, about the edge of the wafer 10 to space the wafer 10 from an adjacent wafer when the wafers are disposed in a row, or stack, for the purpose hereinafter appearing.

Figure 2:
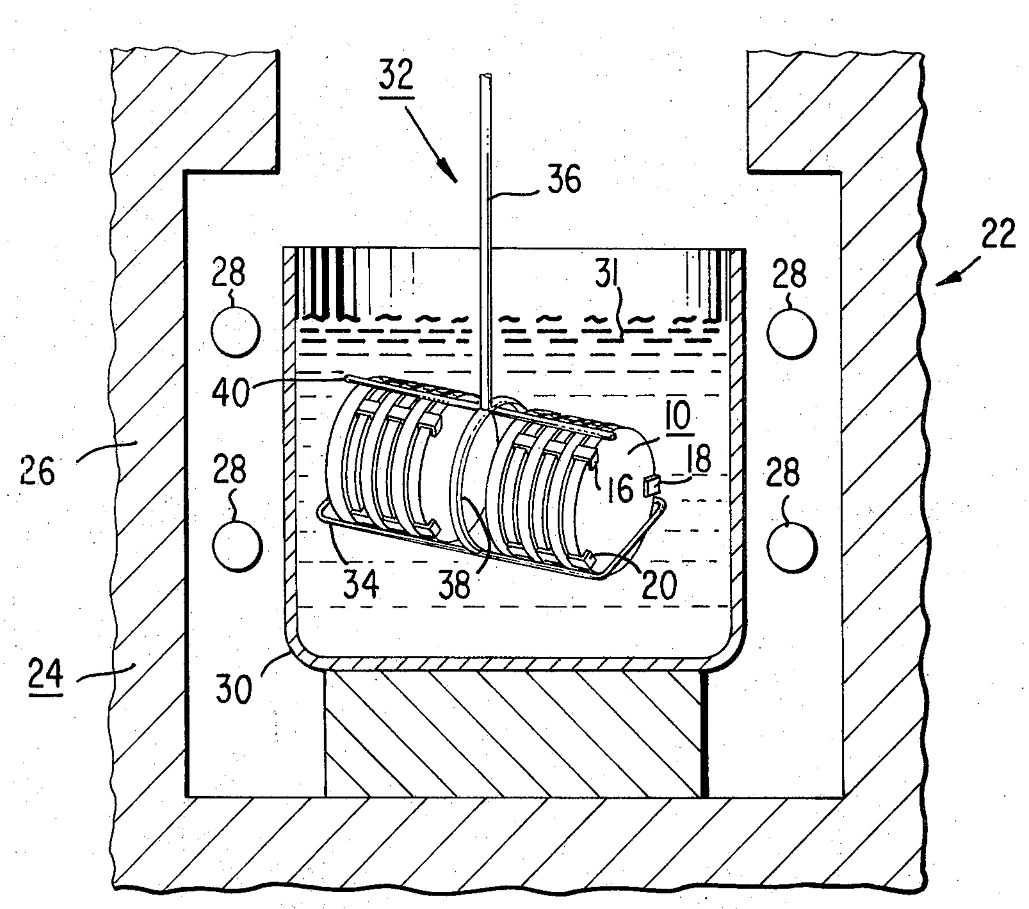
FIG. 2 is a schematic cross-sectional view of apparatus for carrying out the novel method of chemically polishing sapphire and spinel.

Referring now to FIG. 2 of the drawing, there is shown apparatus 22 for carrying out the novel method of chemically polishing bodies, or wafers 10, of sapphire and spinel. The apparatus 22 comprises a resistance furnace 24 having a fire brick furnace wall 26 disposed about a plurality of electrically operated heating elements 28 for heating the resistance furnace over a range of desired temperatures. A platinum crucible 30 is disposed within the resistance furnace 24 and filled with a melt 31 that may comprise either 100 per cent (anhydrous) molten borax ($Na_2B_4O_7$) or molten borax with between 5 and 10 mole per cent aluminum oxide dissolved in the melt for the purposes hereinafter appearing.

A holder 32, for immersing one or more of the wafers 10 into the melt 31, comprises a rectangular frame 34 of platinum wire secured to a platinum wire handle 36 by means of a platinum wire yoke 38. A platinum wire 40 is fixed to the junction of the yoke 38 and the handle 36 and extends parallel to the frame 34 for retaining the wafers 10 in the holder 32 when the wafers 10 are immersed in the melt 31, as will hereinafter be explained.

Before chemically polishing the surfaces of the wafers 10 of either sapphire or spinel, the as-sawed surfaces 12 and 14 of the wafer 10 are rough lapped with an abrasive powder of a hardness substantially near that of the wafer 10. For example, the surfaces 12 and 14 are rough lapped with an abrasive powder of boron carbide or diamond grit having particles whose average diameter is about 25 $\mu$m.

The rough lapped (100) crystallographic oriented major surfaces 12 and 14 of a single wafer 10 of spinel is chemically polished by immersing the wafer 10, disposed in the holder 32, into the melt 31 consisting of molten borax heated to a temperature of between 800°C and 900°C. The chemical polishing is continued until between about 1 and 2 mils of material are removed from each of the surfaces 12 and 14 to be polished. Under the aforementioned conditions, polishing takes place in about 1 to 2 hours, depending upon the temperature of the melt 31. By this method, very smooth polished surfaces 12 and 14 are obtained on wafers of both stoichiometric and alumina-rich material.

A plurality of wafers 10 of spinel can be chemically polished by the novel method by disposing the wafers 10 in the holder 32, in a line, or row, with the adjacent major surfaces of adjacent wafers 10 spaced from each other a distance of at least 125 mils, and immersing the wafers 10 into the melt 31 of molten borax, heated to a temperature of between 800°C and 900°C. If the wafers 10 of spinel are disposed closer to each other than 125 mils, the concentration of aluminum oxide in the melt 31, resulting from the dissolved portions of the wafers 10, causes the etching (chemical polishing) to proceed at too slow a rate for practical purposes. Also, a spacing of less than 125 mils causes a preferential dissolution of MgO from the spinel surface, resulting in a badly pitted surface.

Figure 4:
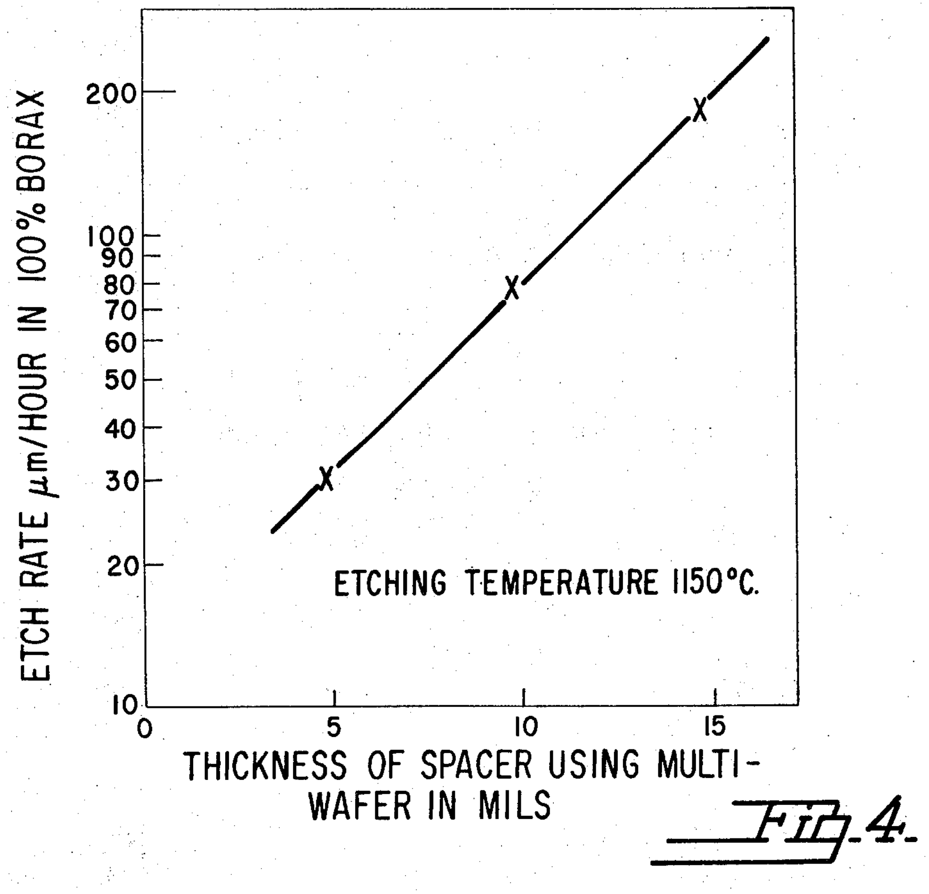
FIG. 4 is a graph of the etch rate of sapphire wafers, at a temperature of 1,150°C, as a function of the spacing between the sapphire wafers in molten borax.

In accordance with a preferred embodiment of the novel method, a plurality of wafers 10 of a single-crystal sapphire can have their (1$\bar{1}$02), or equivalent, crystallographic oriented surfaces 12 and 14 polished in the melt 31 of 100 percent molten borax if the melt 31 is heated to a temperature of between 1,000°C and 1,200°C and the adjacent surfaces of adjacent wafers 10 are spaced between 7 and 13 mils from each other. The spacers 16, 18, and 20 are frictionally adhered to the wafers 10, and the wafers 10 are stacked adjacent to each other, as shown in FIG. 2. The chemical polishing should continue long enough to remove between 1 and 2 mils of material from each of the surfaces to be polished. The etch (polishing) rate varies with the temperature of the melt 31 and the spacing between the wafers 10, as shown by the graph of FIG. 4.

The reason for spacing the wafers 10 of sapphire no more than about 13 mils from each other in the melt 31 of 100 percent molten borax is to provide the immediate surfaces that are being etched with a melt that includes both the borax and the aluminum oxide removed from the etched surface. Under these conditions, very smooth polished surfaces of the wafers 10 are obtained in from ½ to 1½ hours. If the spacing between the wafers 10 in the melt 31 of 100 per cent borax were greater than 13 mils, the surfaces of the wafers 10 would be etched at too fast a rate, and some pitting of the surfaces would result and the flatness of the surfaces would be sacrificed.

Figure 3:
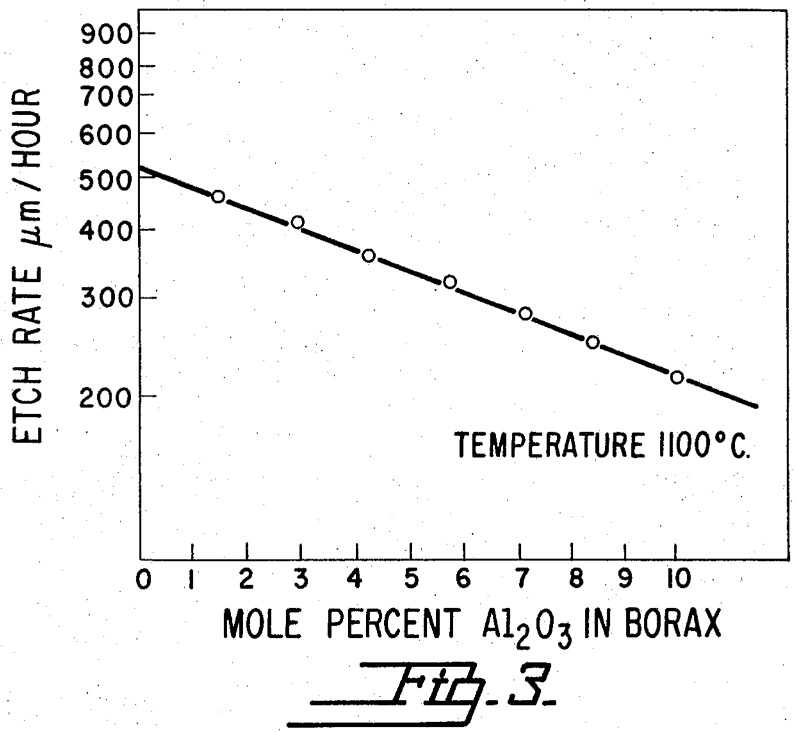
FIG. 3 is a graph of the etch rate of a single sapphire wafer immersed in a melt comprising aluminum oxide and borax, at 1,100°C, as a function of the aluminum oxide concentration in molten borax.

It is desired to etch the (1$\bar{1}$02), or equivalent, crystallographic oriented surface of a single wafer 10 of sapphire, the melt 31 should be heated to a temperature between 1,000°C and 1,200°C and should include between 5 and 10 mole per cent aluminum oxide ($Al_2O_3$) dissolved therein. Under these conditions, the rough lapped wafer 10 is etched to remove between 1 and 2 mils from its surface. The duration of the etch, resulting in the polishing of the surfaces, depends upon the temperature of the melt 31 and the concentration of aluminum oxide in the molten borax, as illustrated by the graph in FIG. 3.

The novel method of chemically polishing both sapphire and spinel substrate wafers, as described, provides excellent surfaces for the deposition of (100) oriented epitaxial silicon films thereon because the chemically polished surfaces are very smooth, free of scratches, etch pits, and work damage. The novel method of chemically polishing sapphire and spinel wafers provides polished wafers that are lower in cost in comparison to wafers polished by mechanical means. Also, the *p*- and *n*- mobilities, as measured in 1 $\mu$m thick silicon films deposited on (1$\bar{1}$02) chemically polished sapphire, in accordance with the present method, compare very favorably with those that have been obtained on the best mechanically polished sapphire or spinel substrates. What is claimed is:

1. A method of polishing the major surfaces of a plurality of electrically insulating, single crystal wafers selected from the group consisting of sapphire and spinel, said method comprising disposing said wafers, in a holder, in a line and with adjacent major surfaces of adjacent wafers spaced from each other, and immersing said holder, with said separated wafers disposed thereon, in a melt comprising molten borax until said major surfaces are polished, said melt being heated to a temperature of between 1,000° C and 1,200° C when sapphire is being polished and between 800° C and 900° C when spinel is being polished, and rough lapping at least a major surface of each of said wafers to a relatively smooth finish with abrasive powder before it is immersed in said melt to be polished further.

2. The method of claim 1 wherein said abrasive powder comprises particles having an average diameter of about 25 $\mu$m and a hardness substantially near that of said wafers.

3. The method of claim 1 wherein said wafers consist of sapphire, and said major surfaces are (1$\bar{1}$02) or ($\bar{1}$012) or (01$\bar{1}$2) crystallographic oriented surfaces in contact with said melt.

4. The method of claim 3 wherein said wafers consist of sapphire separated from each other in said melt by a distance of between 7 and 13 mils.

5. The method of claim 3 wherein said melt also contains between 5 and 10 mole per cent of aluminum oxide.

6. A method of polishing a surface of an electrically insulating, single-crystal body of sapphire, said method comprising:

providing a melt of molten borax heated to a temperature between 1,000°C and 1,200°C, said melt having 5 to 10 mole per cent of aluminum oxide dissolved therein, and immersing said sapphire body in said melt, said body having a $(1\bar{1}02)$ or $(\bar{1}012)$ or $(01\bar{1}2)$ crystallographic oriented surface.

* * * * *